(12) United States Patent
Nam et al.

(10) Patent No.: US 7,453,529 B2
(45) Date of Patent: Nov. 18, 2008

(54) STEREOSCOPIC IMAGE DISPLAY DEVICE AND ELECTRONIC DEVICE WITH THE SAME

(75) Inventors: Hui Nam, Suwon-si (KR); Jang-Doo Lee, Suwon-si (KR); Hyoung-Wook Jang, Suwon-si (KR); Myoung-Seop Song, Suwon-si (KR); Beom-Shik Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 506 days.

(21) Appl. No.: 11/136,858

(22) Filed: May 24, 2005

(65) Prior Publication Data

US 2006/0082519 A1    Apr. 20, 2006

(30) Foreign Application Priority Data

Oct. 19, 2004    (KR) .................. 10-2004-0083459

(51) Int. Cl.
*G02F 1/1335*    (2006.01)
*G02F 1/1343*    (2006.01)

(52) U.S. Cl. ........................ 349/15; 349/141
(58) Field of Classification Search .............. 349/15, 349/141
See application file for complete search history.

(56) References Cited

U.S. PATENT DOCUMENTS 6,005,650 A * 12/1999 Kim et al. ................. 349/130
6,091,463 A * 7/2000 Robinson et al. ........... 349/25

FOREIGN PATENT DOCUMENTS

| DE | 200 22 456 | 10/2001 |
| EP | 0 822 441 | 2/1998 |
| EP | 1 357 726 | 10/2003 |
| EP | 1 379 063 | 1/2004 |
| KR | 10-1999-0085280 | 12/1999 |
| WO | WO 2004/063914 | 7/2004 |

OTHER PUBLICATIONS

European Search Report, dated Dec. 8, 2005, Application No. 05105184.5, in the name of Samsung SDI Co., Ltd.
German Utility Model Publication for DE 200 22 456, Publication Date Oct. 11, 2001, in the name of 4D-Vision GmbH.
Korean Patent Abstracts, Publication No. KR 10-1999-0085280, dated Dec. 6, 1999, in the name of Soon-Young Lee.

* cited by examiner

*Primary Examiner*—Michael H Caley
(74) *Attorney, Agent, or Firm*—Christie, Parker & Hale, LLP

(57) ABSTRACT

A stereoscopic image display device including a light source and a light controller for selectively transmitting or blocking light provided by the light source. The light controller includes a first substrate, and first and second electrodes alternatively formed on the first substrate along a first direction. The first and second electrodes are spaced apart from each other at a predetermined interval. The first and second electrodes are electrically connected, respectively, to first and second connection electrodes. The light controller also includes a second substrate which is substantially parallel to the first substrate, and third and fourth electrodes alternately formed on the second substrate along a second direction. The third and fourth electrodes are spaced apart from each other at a predetermined interval. The third and forth electrodes are electrically connected, respectively, to third and fourth connection electrodes.

27 Claims, 13 Drawing Sheets

STEREOSCOPIC IMAGE DISPLAY DEVICE AND ELECTRONIC DEVICE WITH THE SAME

CROSS-REFERENCE TO RELATED APPLICATIONS

This application claims priority to and the benefit of Korean Patent Application No. 10-2004-0083459 filed on Oct. 19, 2004 in the Korean Intellectual Property Office, the entire content of which is incorporated herein by reference.

BACKGROUND OF THE INVENTION

1. Field of the Invention

The present invention relates to a stereoscopic image display device, and more particularly, to a display device for realizing a stereoscopic image by using a light transmission/block module of the liquid crystal barrier type and an electronic device having the same.

2. Description of the Related Art

Generally, three dimensional ("3D") displays supply different views to the left and right eyes of a user such that the user can have the depth and 3D perception of the viewing images. The 3D displays may be classified into stereoscopic displays for which the user should wear viewing aids, such as polarizing glasses, and autostereoscopic displays with which the user can see a desired 3D image without wearing such viewing aids.

A common autostereoscopic display utilizes an optical split element (or optical separation element), such as a lenticular lens or a parallax barrier, to spatially separate the left eye image and the right eye image displayed at the image display unit in the directions of the left and right eyes of the user, respectively.

In order to meet the needs of consumers, a display portion of monitors or mobile phones is not fixed to be a landscape type which is longer in the horizontal direction or a portrait type which is longer in the vertical direction, but can be used as either type in accordance with the selection by the user. The change of the display pattern can be achieved by mechanically rotating a display portion by 90 degrees with respect to the body of the electronic device.

In accordance with the current trend in the development of the electronic devices, if such a stereoscopic image display device could supply stereoscopic images corresponding to each pattern of the display portion, it can provide much higher satisfaction of use to users. However, stereoscopic image display devices which have been developed until now could supply three dimensional images only as either the landscape type or the portrait type, but not both, because of the limitation of the optical split element.

Accordingly, although users want to see an image realized on a display portion as two or three dimensional image at various patterns of a display portion through one electronic device, such a stereoscopic image display device has not yet been provided, and thus, it is desirable to provide such a device.

SUMMARY OF THE INVENTION

According to one aspect of the present invention, there is provided a stereoscopic image display device in which a three dimensional image can be appropriately realized in accordance with the changed pattern of a display portion even in the case where the pattern of the display portion for realizing an image is changed as needed.

In addition, an electronic device having the above image display device is provided.

In an exemplary embodiment according to the present invention, a stereoscopic image display device for providing a stereoscopic image to a user, is provided. The stereoscopic image display device includes a light source and a light controller for selectively transmitting or blocking light provided by the light source. The light controller includes a first substrate, and first electrodes formed on the first substrate along a first direction of the first substrate. The first electrodes are spaced apart from each other at a predetermined interval. A first connection electrode is arranged on one side of the first electrodes and electrically connected to the first electrodes to form a first electrode set together with the first electrodes. Second electrodes are formed along the first direction and arranged between the first electrodes. A second connection electrode is arranged on one side of the second electrodes and electrically connected to the second electrodes to form a second electrode set together with the second electrodes.

In addition, the light controller includes a second substrate, and third electrodes formed on the second substrate along a second direction which is perpendicular to the first direction. The third electrodes are spaced apart from each other at a predetermined interval. A third connection electrode is arranged on one side of the third electrodes and electrically connected to the third electrodes to form a third electrode set together with the third electrodes. Fourth electrodes are formed along the second direction arranged between the third electrodes. A fourth connection electrode is arranged on one side of the fourth electrodes and electrically connected to the fourth electrodes to form a fourth electrode set together with the fourth electrodes. The light controller also includes liquid crystal disposed between the first substrate and the second substrate.

At least one of the first electrodes may be arranged between the second electrodes, and a number of the first electrodes that are arranged between two neighboring ones of the second electrodes may be the same at all locations on the first substrate.

At least one of the second electrodes may be arranged between two neighboring ones of the first electrodes, and a number of the second electrodes that are arranged between two neighboring ones of the first electrodes may be the same at all locations on the first substrate.

At least one of the third electrodes may be arranged between the fourth electrodes, and a number of the third electrodes that are arranged between two neighboring ones of the fourth electrodes may be the same at all locations on the second substrate.

At least one of the fourth electrodes may be arranged between the third electrodes, and a number of the fourth electrodes that are arranged between two neighboring ones of the third electrodes may be the same at all locations on the second substrate.

The first substrate may be formed in a shape of a rectangle having a pair of long sides and a pair of short sides, and the first direction may be a direction along the short sides of the first substrate. The first electrodes and the second electrodes may be configured as a common electrode.

Further, the second substrate may be formed in a shape of a rectangle having a pair of long sides and a pair of short sides, and the second direction may be a direction along the long sides of the second substrate. The third electrodes and the fourth electrodes may be configured as a segment electrode.

The stereoscopic image display device may further include an imager for displaying a left eye image and a right eye image, wherein the imager may be interposed between the light source and the light controller.

The stereoscopic image display device may further include an imager for displaying a left eye image and a right eye image, wherein the light controller may be interposed between the light source and the imager. The imager may be a liquid crystal display panel.

The electrodes of the first electrode set, the electrodes of the second electrode set, the electrodes of the third electrode set, and the electrodes of the fourth electrodes may be formed in a shape of a comb.

In another exemplary embodiment according to the present invention, a stereoscopic image display device for providing a stereoscopic image to a user, is provided. The stereoscopic image display device includes a light source and a light controller for selectively transmitting or blocking light provided by the light source.

The light controller includes a first substrate, a surface electrode formed on a substantially entire surface of the first substrate, and a second substrate. The light controller also includes branch type electrodes, each having a parent electrode portion arranged along one direction of the second substrate and plural branched electrode portions formed by branching off from the parent electrode portion. The branch type electrodes are arranged as multiple layers on the second substrate that are insulated from each other. The light controller also includes liquid crystal disposed between the first substrate and the second substrate. The branched electrode portions of the branch type electrodes are arranged to cross over each other.

The parent electrode portions of the branch type electrodes may be arranged to cross over each other.

The parent electrode portion of one branch type electrode of the branch type electrodes may be arranged to be parallel with the branched electrode portions of another branch type electrode of the branch type electrodes.

An electronic device according to yet another exemplary embodiment of the present invention may include a display portion including one of the stereoscopic image display devices mentioned above and a body rotatably connected to the display portion.

Such electronic devices may be used as mobile devices such as mobile phones or as office devices such as monitors.

In yet another exemplary embodiment according to the present invention, a method of driving a stereoscopic image display device is provided. The method includes:

in a first mode when the light controller is in a predetermined position, applying a reference voltage to the first electrode set and the second electrode set; selecting one electrode set of the third electrode set and the fourth electrode set; and applying a data voltage thereto to split an image into a left eye image and a right eye image; and in a second mode when the light controller is rotated from the predetermined position, applying a reference voltage to the third electrode set and the fourth electrode set; selecting one electrode set of the first electrode set and the second electrode set; and applying a data voltage thereto to split an image into a left eye image and a right eye image.

In yet another exemplary embodiment according to the present invention, a method of driving a stereoscopic image display device is provided. The method includes:

in a first mode when the light controller is in a predetermined position, applying a reference voltage to the surface electrode; selecting one branch type electrode of the branch type electrodes; and applying a data voltage thereto to split an image into a left eye image and a right eye image; and in a second mode when the light controller is rotated from the predetermined position to another position, applying a reference voltage to the surface electrode; selecting another branch type electrode of the branch type electrodes; and applying a data voltage thereto to split an image into a left eye image and a right eye image.

In yet another exemplary embodiment according to the present invention, a stereoscopic image display device is provided. The stereoscopic image display device includes a display panel for displaying an image, the display panel having a pair of first sides and a pair of second sides. The stereoscopic image display device also includes a light controller adjacent to the display panel for separating the image into a left eye image and a right eye image. The light controller is adapted to separate the image into the left eye image and the right eye image to provide a stereoscopic image to an observer regardless of whether the first sides or the second sides are substantially parallel to a line between eyes of the observer.

BRIEF DESCRIPTION OF THE DRAWINGS

The above and other features of the present invention will become more apparent by describing certain exemplary embodiments thereof in detail with reference to the accompanying drawings in which.

DETAILED DESCRIPTION

Exemplary embodiments of the present invention will now be described in detail with reference to the accompanying drawings.

Figure 1:
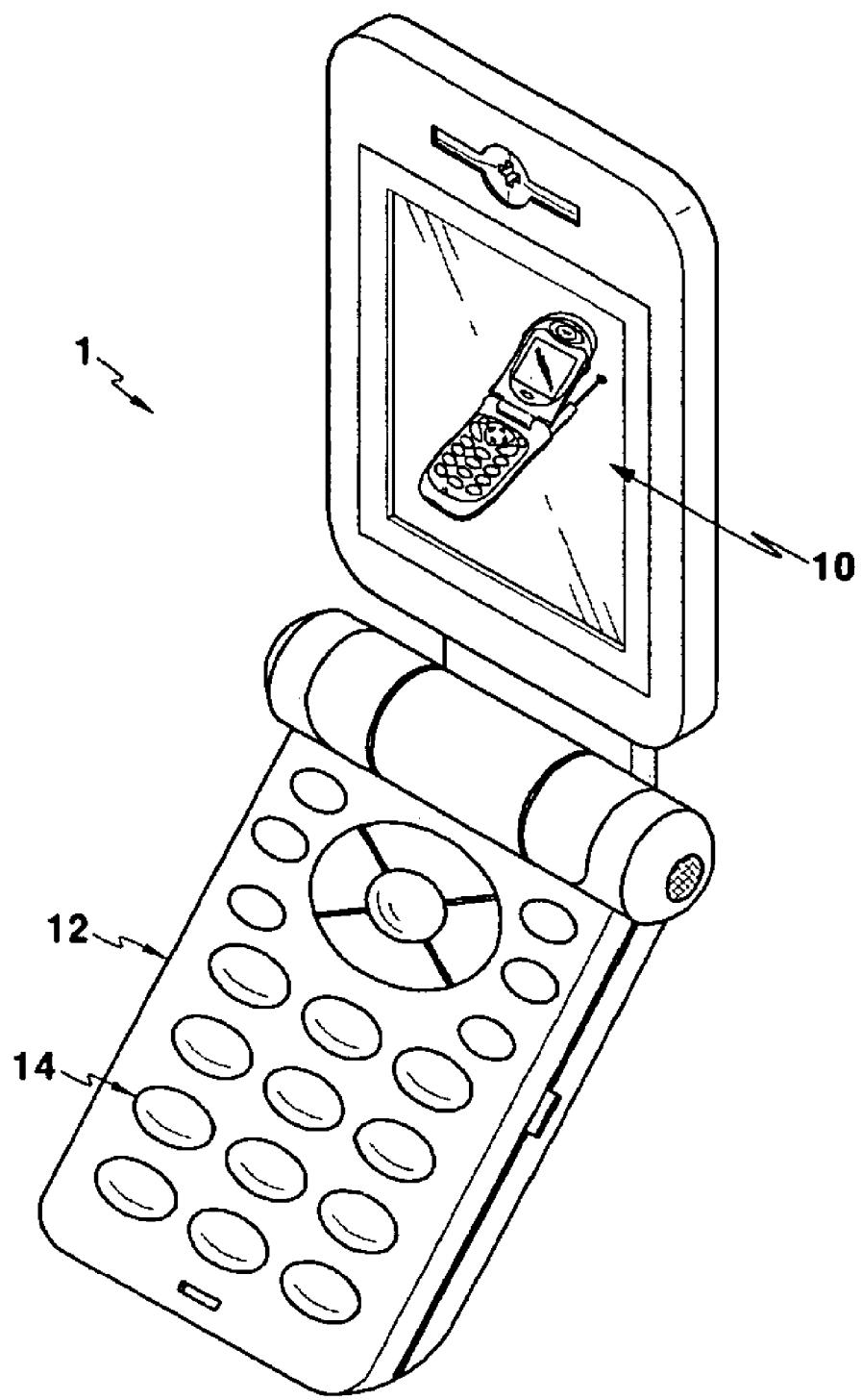
FIG. 1 is a perspective view of a first mode of an electronic device according to one exemplary embodiment of the present invention.

FIG. 1 is a perspective view of an electronic device with a stereoscopic image display device according to one exemplary embodiment of the present invention.

As shown in FIG. 1, the electronic device is a mobile phone (i.e., a cellular phone) which is one of electronic devices for a portable or mobile use. Those skilled in the art would recognize that the principles of the present invention can be applied to any mobile electronic devices, and are not limited to the mobile phone applications. By way of example, the principles of the present invention can also be applied to other portable electronic devices such as a personal digital assistant (PDA) or the like.

As known, a mobile phone 1 has a display portion 10 for displaying a predetermined image, and a body 12 connected to the display portion 10. The display portion 10 includes a liquid crystal display device for displaying images, and a keypad 14 can be mounted on the body 12 as an input device.

Figure 2:
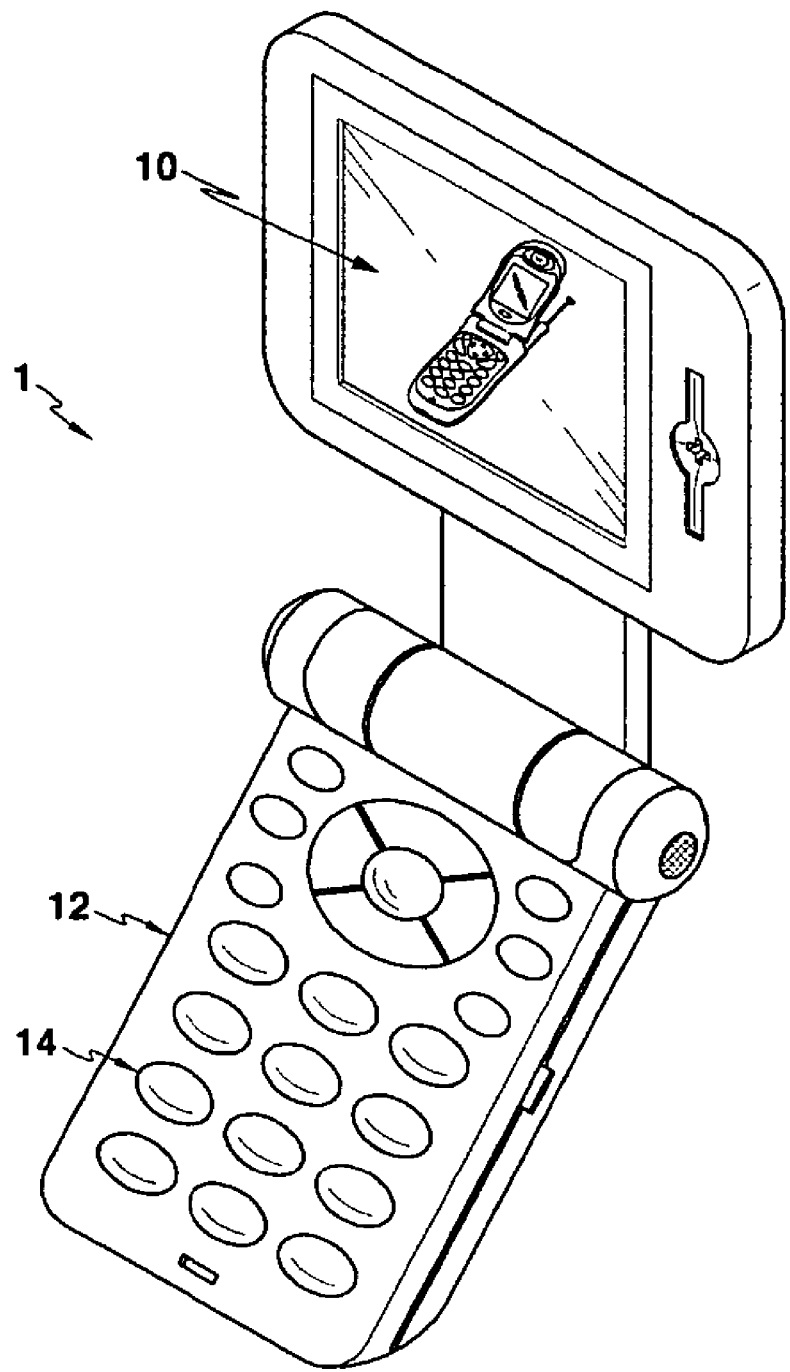
FIG. 2 is a perspective view of a second mode of the electronic device according to one exemplary embodiment of the present invention.

As shown in FIG. 2, the mobile phone 1 can provide a user with an image realized on the display portion 10 after rotating the display portion 10 by a predetermined angle, for example, by 90 degrees with respect to the body 12.

That is, the mobile phone 1 in FIG. 1 maintains the display portion 10 in a portrait mode (hereinafter, "a first mode") and provides a user with an image realized on the display portion 10. In FIG. 2 where the display portion 10 is rotated by 90 degrees, the mobile phone 1 maintains the display portion 10 in a landscape mode (hereinafter, "a second mode") and provides the user with an image realized on the display portion 10.

As the structure/mechanism using which the display portion 10 is rotated with respect to the body 12 is known to those skilled in the art, the detailed description thereof will not be provided herewith.

Figure 3:
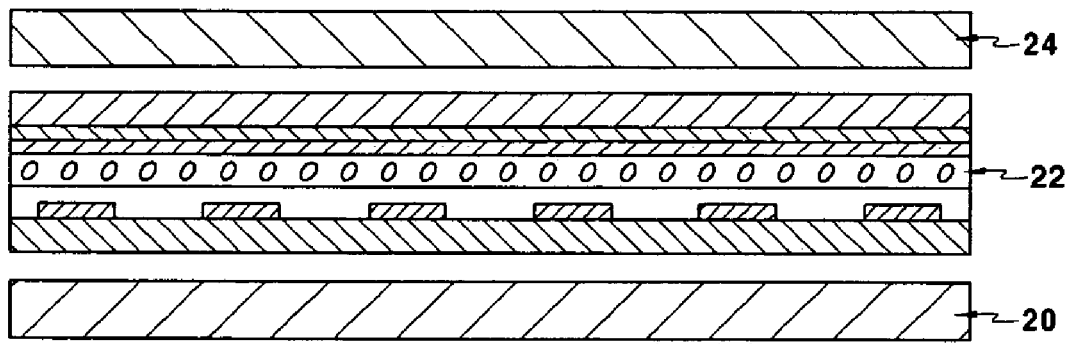
FIG. 3 is a cross-sectional view of a stereoscopic image display device according to exemplary embodiments of the present invention.

FIG. 3 is a schematic view of a stereoscopic image display device according to exemplary embodiments of the present invention, and the stereoscopic image display device forms the display portion 10 of FIGS. 1 and 2, for example.

As shown in FIG. 3, the stereoscopic image display device includes a light source 20, an imager 22 arranged on one side of the light source 20 to display a predetermined image by receiving the light provided by the light source 20, and a light controller 24 arranged on one side of the imager 22 to split the image realized on the imager 22 into a left eye image and a right eye image when the user operates the mobile phone 1 to display three dimensional images on the display portion 10.

The light source 20 can have a structure such that a point light source emitted from a light emitting diode (LED) is changed into an area light source through a light guide panel to provide to the imager 22, but the structure of the light source 20 of the present invention is not limited thereto. For example, when the electronic device is formed with other devices such as an LCD monitor, it can have other structure which uses lamps such as cold cathode fluorescent lamps or external electrode fluorescent lamps to provide the light.

The imager 22 of one exemplary embodiment of the present invention has a structure of a liquid crystal display panel, and images can be realized in color using color filters. When the imager 22 realizes a three dimensional image, it arranges pixels corresponding to a left eye image ($L_R, L_G, L_B$) and pixels corresponding to a right eye image ($R_R, R_G, R_B$) as shown in FIGS. 4A and 4B.

Figure 4A:
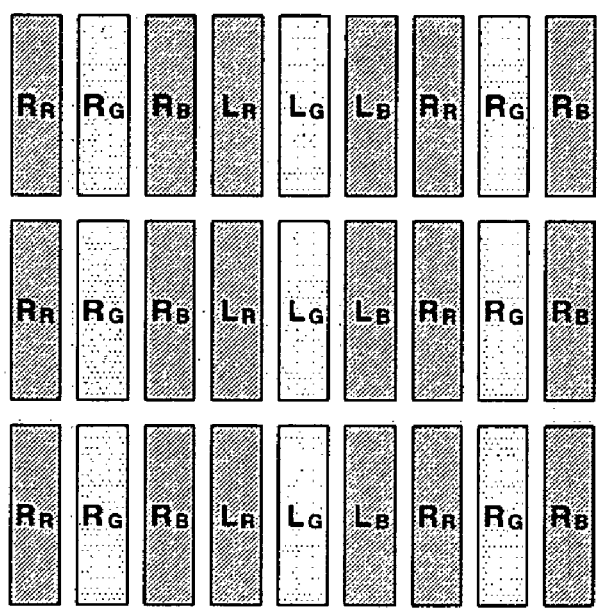
FIGS. 4A and 4B are schematic drawings that illustrate pixel patterns of an imager according to the present invention.
Figure 4B:
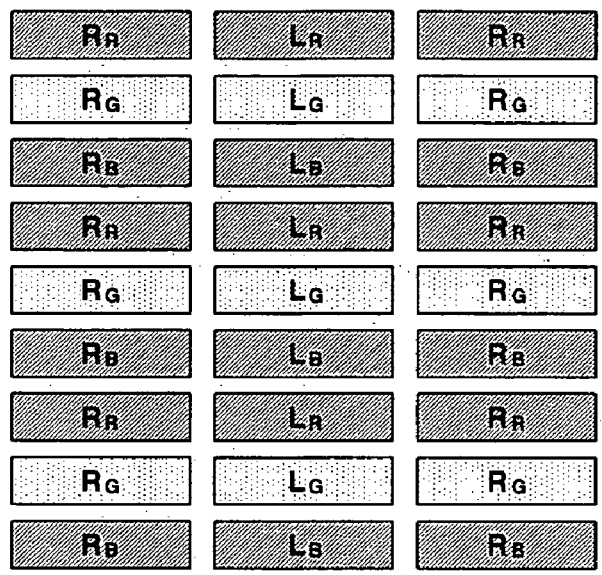

FIG. 4A shows the arrangement of pixels for a left eye image ($L_R, L_G, L_B$) and pixels for a right eye image ($R_R, R_G, R_B$) of the imager 22 in the first mode, and FIG. 4B shows the arrangement of pixels for a left eye image ($L_R, L_G, L_B$) and pixels for a right eye image ($R_R, R_G, R_B$) of the imager 22 in the second mode.

In the present invention, the splitting or separation of the image into a left eye image and a right eye image can be carried out not only with a single pixel having R, G, B sub pixels as a split unit, but can also be carried out with any one or two of R, G, B sub pixels as a split unit. Further, four or more sub pixels can be regarded as a split unit as well.

In addition, although FIGS. 4A and 4B show the pixels based on R, G, B colors, the present invention is not limited only to the electronic devices for displaying full color images. The colors corresponding to the sub pixels can also be applied in the black and white mode or other simple color mode.

As the structure of the LCD panel of the imager 22 has the structure of the known LCD panel, no further description will be provided herewith.

The light controller 24 provides the light to a user by transmitting or blocking the light provided by the light source 20. More specifically, the light controller 24 provides the light corresponding to a left eye image and the light corresponding to a right eye image which are realized on the imager 22, thereby enabling the user to perceive the image as a three dimensional image.

The light controller 24, as described below, can be referred to as a liquid crystal barrier since the light passing through the imager 22 is transmitted or blocked by driving liquid crystal in the light controller 24.

Figure 5:
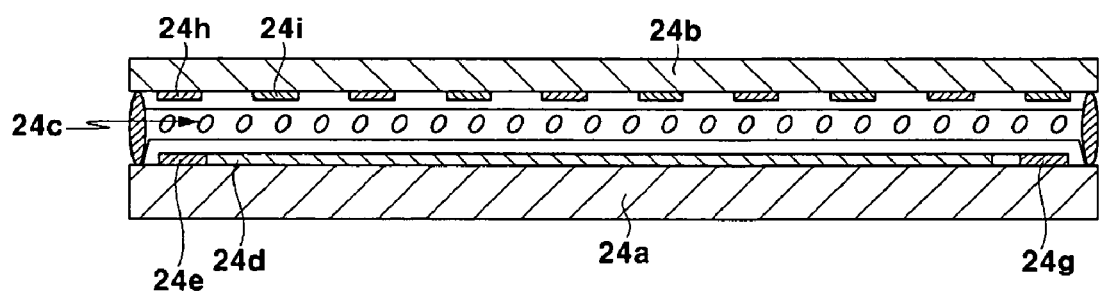
FIG. 5 is a cross-sectional view of a light controller according to a first exemplary embodiment of the present invention.
Figure 6A:
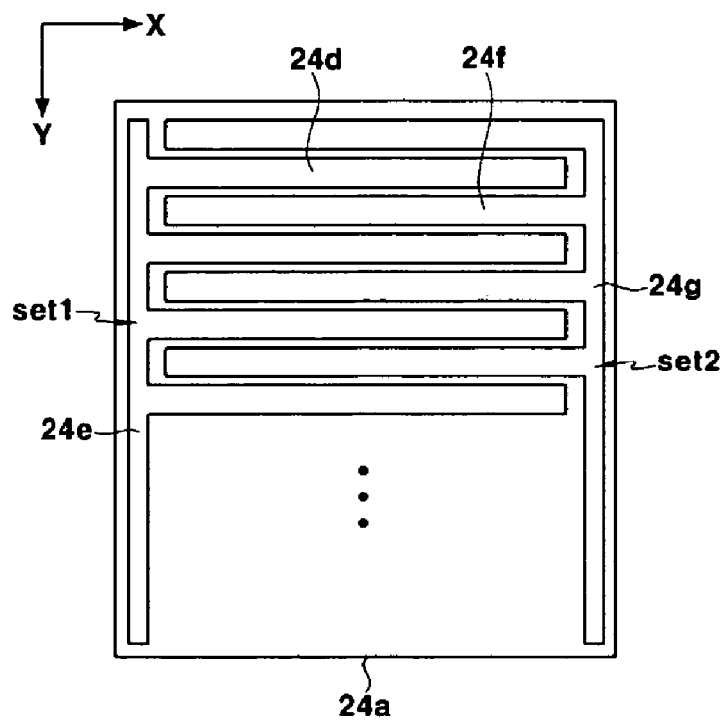
FIGS. 6A and 6B are plan views that illustrate electrode portions according to the first exemplary embodiment of the present invention.
Figure 6B:
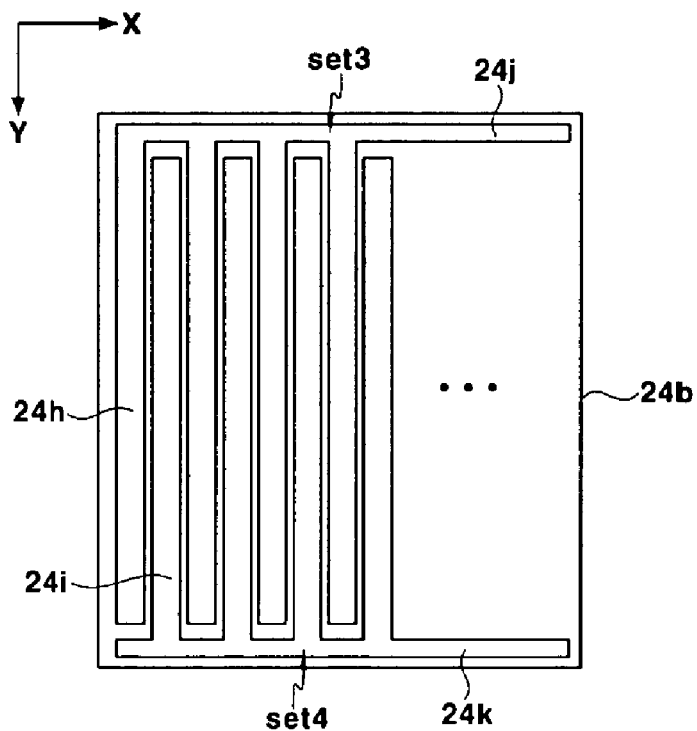

FIG. 5 is a cross-sectional view illustrating a light controller 25 in a first exemplary embodiment of the present invention. The light controller 25, for example, can be used as the light controller 24 of FIG. 3. As shown in FIG. 5, the light controller 25 includes two substrates, a first substrate 24a and a second substrate 24b, which are spaced apart at a predetermined distance. The first and second substrates 24a, 24b are glasses in the shape of a rectangle having a pair of short sides and a pair of long sides. FIGS. 5, 6A and 6B together illustrate the structure of the light controller 25.

Electrodes for driving liquid crystal 24c disposed between the first substrate 24a and the second substrate 24b are formed on the surfaces of the first substrate 24a and the second substrate 24b that face or oppose each other. The electrodes include transparent material such as indium tin oxide (ITO), and will be further described below.

The electrode formed on one surface of the first substrate 24a, as shown in FIG. 6A, includes plural first electrodes 24d which are arranged along a first direction of the first substrate 24a (a direction corresponding to a short side of the first substrate, i.e., the X direction of FIG. 6A). These first electrodes 24d are formed in a stripe pattern, are arranged on the first substrate 24a, and are spaced apart from each other at a predetermined interval. These first electrodes 24d are connected to a first connection electrode 24e arranged on one side of the first substrate 24a (i.e., along the left edge of the substrate 24a in FIG. 6A), such that the electrodes form a comb-shaped first electrode set (Set 1) which includes the first connection electrode 24e and the first electrodes 24d.

In the same manner, a comb-shaped second electrode set (Set 2) is formed on the first substrate 24a. The second electrode set (Set 2) includes second electrodes 24f formed along the first direction (X) and arranged between the first electrodes 24d, and a second connection electrode 24g connected to the second electrodes 24f. The second connection electrode 24g is arranged on the other side of the first substrate 24a opposite to the first connection electrode 24e (i.e., along the right edge of the first substrate 24a in FIG. 5).

The first electrode set (Set 1) and the second electrode set (Set 2) are formed on the first substrate 24a to substantially cover the entire area corresponding to the active area of the imager 22. The distance between one of the first electrodes 24d and an adjacent one of the second electrodes 24f should be less than or equal to 6 μm.

In the same manner, a third electrode set (Set 3) and a fourth electrode set (Set 4), which are also comb-shaped, are formed on a surface of the second substrate 24b opposite to the first substrate 24a.

The third electrode set (Set 3) and the fourth electrode set (Set 4) respectively include plural third electrodes 24h and fourth electrodes 24i that are arranged along one direction of the second substrate 24b. The third electrodes are spaced apart from each other at a predetermined interval, and the fourth electrodes are spaced apart from each other at a predetermined interval. The third electrode set (Set 3) and the fourth electrode set (Set 4) also respectively include a third connection electrode 24j and a fourth connection electrode 24k that are respectively connected to the third electrodes 24h and the fourth electrodes 24i.

However, unlike the first and second electrodes 24d, 24f, the third electrodes 24h and the fourth electrodes 24i are arranged along a second direction (i.e., the Y direction) which is perpendicular to the first direction (i.e., X direction), i.e., along the long side of the second substrate 24b while maintaining a stripe pattern. That is, the first electrodes 24d and the second electrodes 24f are arranged to vertically cross the third electrodes 24h and the fourth electrodes 24i when the first substrate 24a and the second substrate 24b are assembled together.

The third electrode set (Set 3) and the fourth electrode set (Set 4) are formed on the second substrate 24b to substantially cover the entire area corresponding to the active area of the imager 22. The distance between one of the third electrodes 24h and an adjacent one of the fourth electrodes 24i should be less than or equal to 6 μm.

In the first exemplary embodiment of the present invention, one of the first electrodes 24d is uniformly arranged between the second electrodes 24f on the fist substrate 24a, and one of the second electrodes 24f is also uniformly arranged between the first electrodes 24d on the first substrate 24a. However, the present invention is not limited to such a structure. If necessary, more than one of the first electrodes 24d can be arranged between two neighboring second electrodes 24f and/or more than one of the second electrodes 24f can be arranged between two neighboring first electrodes 24d. Moreover, the number of the arranged electrodes can be different such that one of the first electrodes 24d can be disposed between two neighboring second electrodes 24f at one location while more than one of the first electrodes 24d are disposed between two neighboring second electrodes 24f at another location to thereby be non-uniformly arranged. Similarly, the number of the second electrodes 24f disposed between two neighboring first electrodes 24d can be different at different locations on the substrate 24a.

Such structures can also be applied to the third electrodes 24h and the fourth electrodes 24i.

In the first exemplary embodiment of the present invention, the first electrode set (Set 1) and the second electrode set (Set 2) form a common electrode, and the third electrode set (Set 3) and the fourth electrode set (Set 4) form a segment electrode. However, in other embodiments, the third electrode set (Set 3) and the fourth electrode set (Set 4) may for a common electrode, while the first electrode set (Set 1) and the second electrode set (Set 2) form a segment electrode.

Figure 7A:
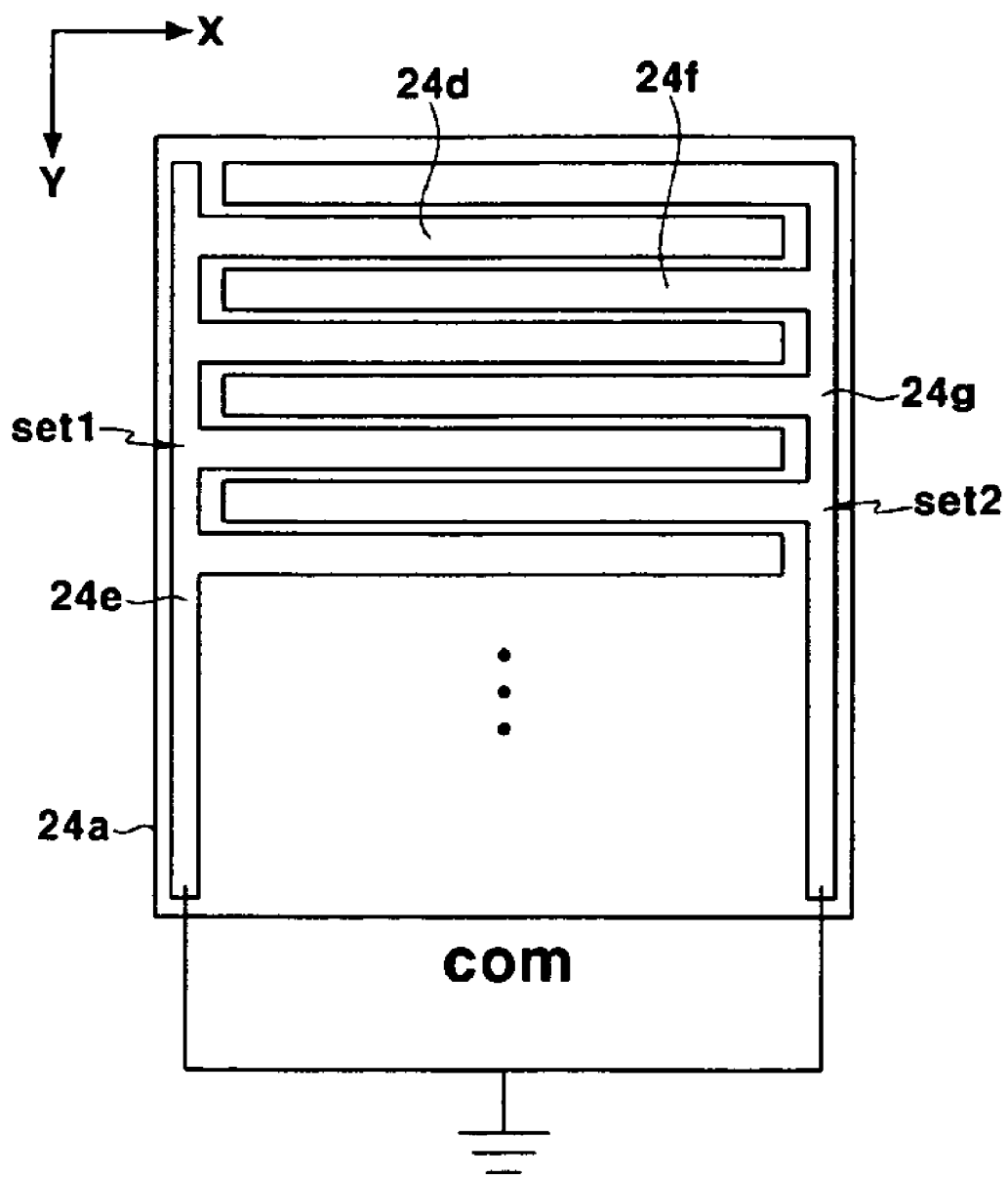
FIGS. 7A and 7B are plan views that illustrate a driving status for the first mode of the light controller according to the first exemplary embodiment of the present invention.

The stereoscopic image display device having the light controller 25 of the above structure works as follows. If the user chooses the three dimensional image mode while the display portion 10 of the mobile phone 1 is in a portrait mode where the display portion 10 is arranged vertically, i.e., the first mode as shown in FIG. 1, a reference voltage is applied to the common electrodes, i.e., the first electrode set (Set 1) and the second electrode set (Set 2), as shown in FIG. 7A. In more detail, the reference voltage is applied to the first electrodes 24d of the first electrode set (Set 1) and the second electrodes 24f of the second electrode set (Set 2) through the first connection electrode 24e of the first electrode set (Set 1) and the second connection electrode 24g of the second electrode set (Set 2), respectively. By way of example, the reference voltage can be applied by connecting the first and second connection electrodes 24e and 24g to ground.

Figure 7B:
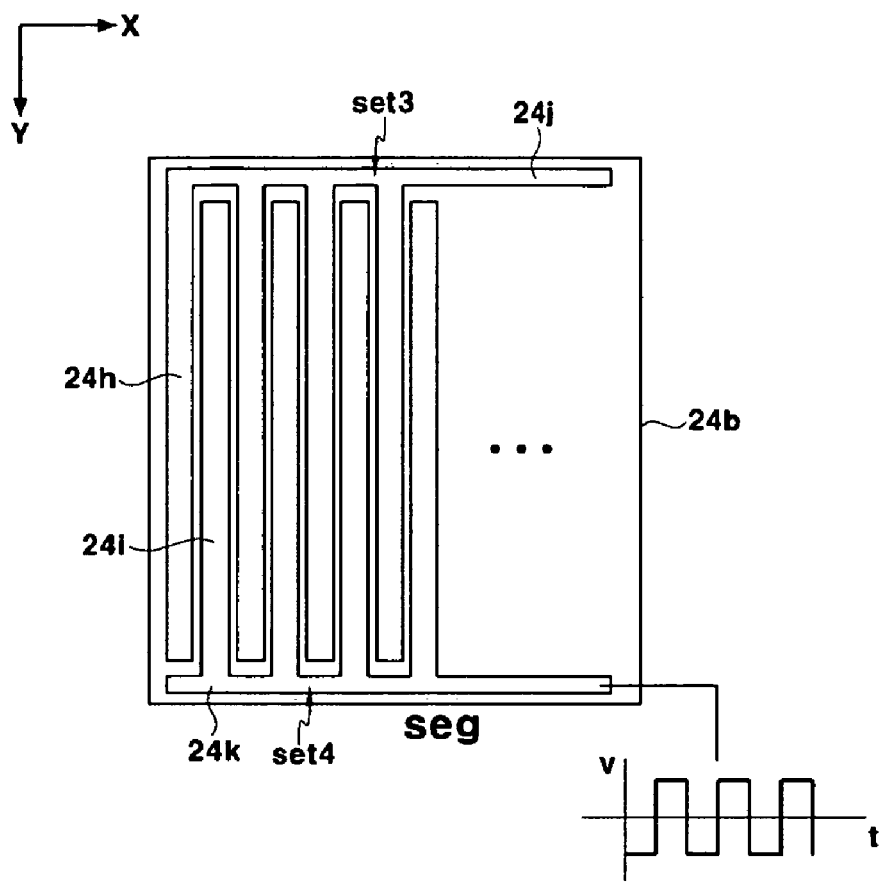

At the same time, a data voltage is applied to one of the third electrode set (Set 3) and the fourth electrode set (Set 4) as shown in FIG. 7B to provide an image realized on the imager 22 to the left eye and the right eye of the user while the image is split into a left eye image and a right eye image.

In the first exemplary embodiment of the present invention as shown in FIG. 7B, the data voltage with a predetermined voltage is applied to the fourth electrode set (Set 4).

As described above, if the reference voltage is applied to the first electrode set (Set 1) and the second electrode set (Set 2), and the data voltage is applied to the fourth electrode set (Set 4), the liquid crystal corresponding to the lines of the fourth electrodes 24i of the fourth electrode set (Set 4) is driven.

Accordingly, light provided from the pixels corresponding to a left eye image and a right eye image of the imager 22 is transmitted at portions where the liquid crystal is driven (the fourth line portions), and blocked at portions where the liquid crystal is not driven (the third line portions), while it passes through the light controller.

Figure 8:
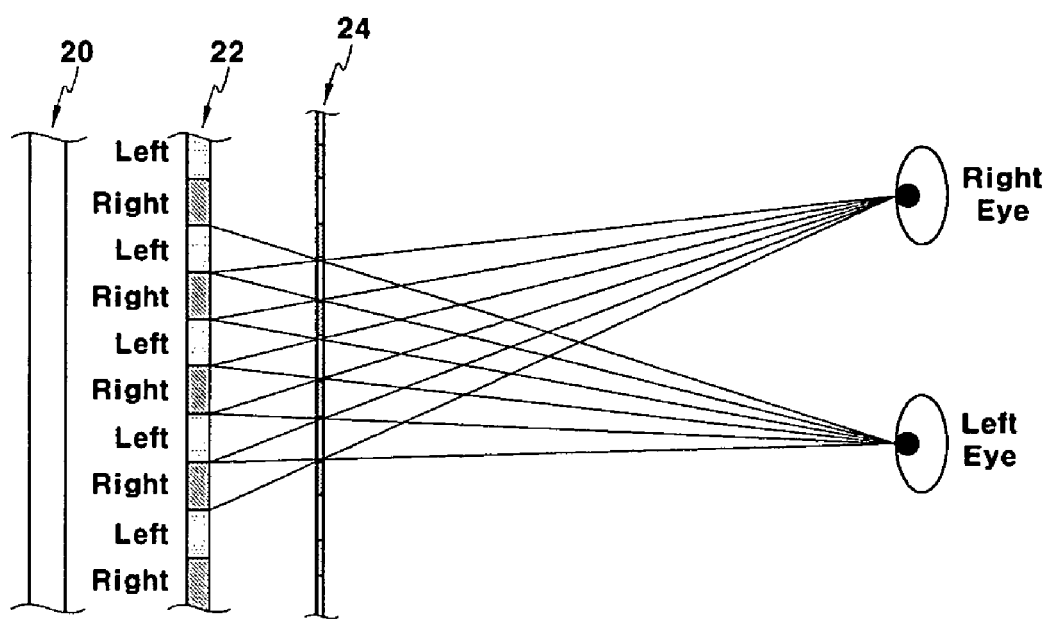
FIG. 8 is a schematic view that illustrate an operational status of the stereoscopic image display device according to the first exemplary embodiment of the present invention.

That is, as shown in FIG. 8, the light is split into the left eye image and the right eye image by the light controller 24 to be provided, respectively, to the left eye and the right eye of a user, which enables the user to perceive the three dimensional image.

On the other hand, in the case where the data voltage is applied to the third electrode set (Set 3), the liquid crystal corresponding to the location of the third electrodes 24h of the third electrode set (Set 3) is driven.

That is, in this case, compared with the above, the location of the driven liquid crystal moves as much as the location of the fourth electrodes 24i, and the effective locations of the light transmitting portions and the light blocking portions of the light controller 24 are changed, and accordingly, the user is provided with the images corresponding to the left eye and the right eye, respectively, at different locations to thereby obtain the three dimensional image.

The case where the display portion 10 is changed into the second mode will be described below.

Figure 9A:
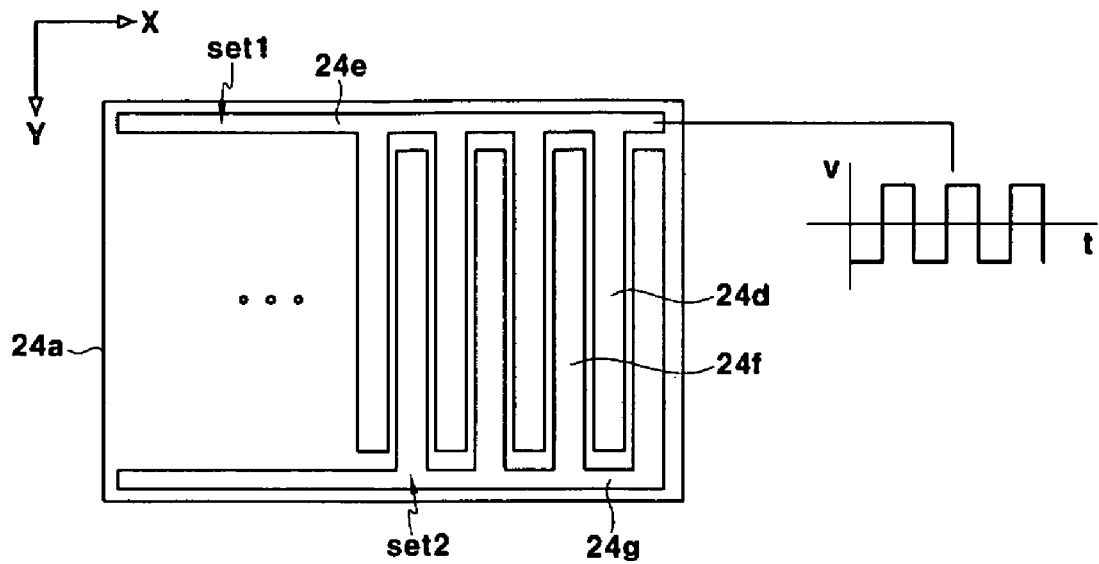
FIGS. 9A and 9B are plan views that illustrate a driving status for the second mode of the light controller according to the first exemplary embodiment of the present invention.
Figure 9B:
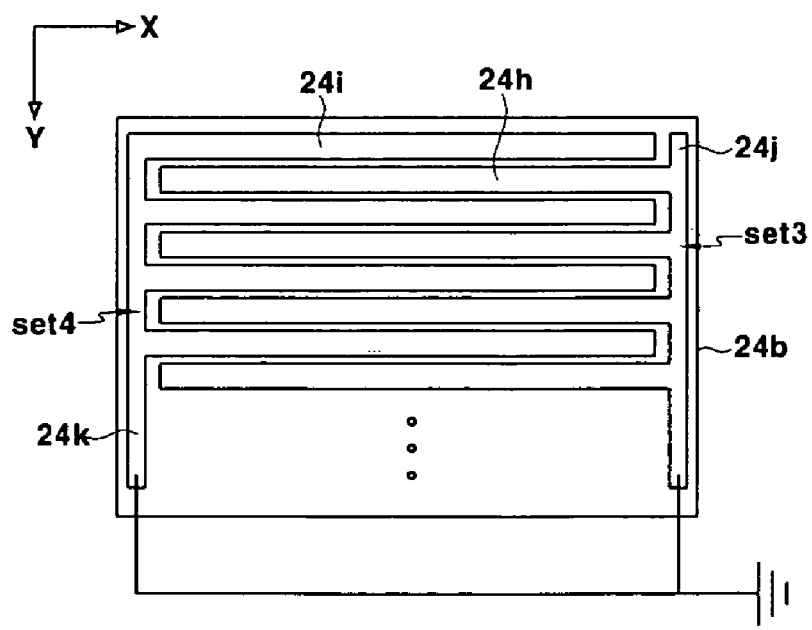

If the user rotates the display portion 10 as shown in FIG. 2 to maintain the display portion 10 to be in a landscape mode where the display portion 10 is arranged longitudinally (the second mode), each of the electrode sets formed on the first and second substrates 24a, 24b are also rotated respectively as shown in FIGS. 9A and 9B to thereby maintain the situation where the electrodes of each of the electrode sets are rotated clockwise from the first mode by 90 degrees.

Under such a situation, the reference voltage and the data voltage are applied to the common electrode and the segment electrode in the opposite direction to the above.

That is, in the second mode, the reference voltage is applied to the third electrode set (Set 3) and the fourth electrode set (Set 4) which are the segment electrodes (FIG. 9B), and the data voltage is applied to one electrode set of the first electrode set (Set 1) and the second electrode set (Set 2) which are the common electrodes (the first electrode set in the present exemplary embodiment) (See FIG. 9A).

Accordingly, in the second mode, the liquid crystal corresponding to the lines of the first electrodes 24d of the first electrode set (Set 1) or the lines of the second electrodes 24g of the second electrode set (Set 2) is driven. By this driving of the liquid crystal, the light transmitting portions and the light blocking portions of the light controller 25 are defined to provide the user with the image realized on the imager 22 as a three dimensional image. As the delivery process of the final three dimensional images by driving the liquid crystal can be carried out in substantially the same manner as described above, a detailed description will not be provided to avoid redundancy.

The light controller 25 according to the first exemplary embodiment of the present invention can provide the user with the image realized on the display unit as the three dimensional image according to the structure of the electrodes formed on the substrate 24a, 24b and the method of voltage application, regardless of whether the display portion 20 is in the portrait mode or in the landscape mode.

A second exemplary embodiment of the present invention will now be described.

In comparison to the first exemplary embodiment described above, the changed element in the second exemplary embodiment is the light controller. Thus, a detailed description for the light controller will be given below, however, a detailed description for other elements will not be provided to avoid redundancy.

Figure 10:
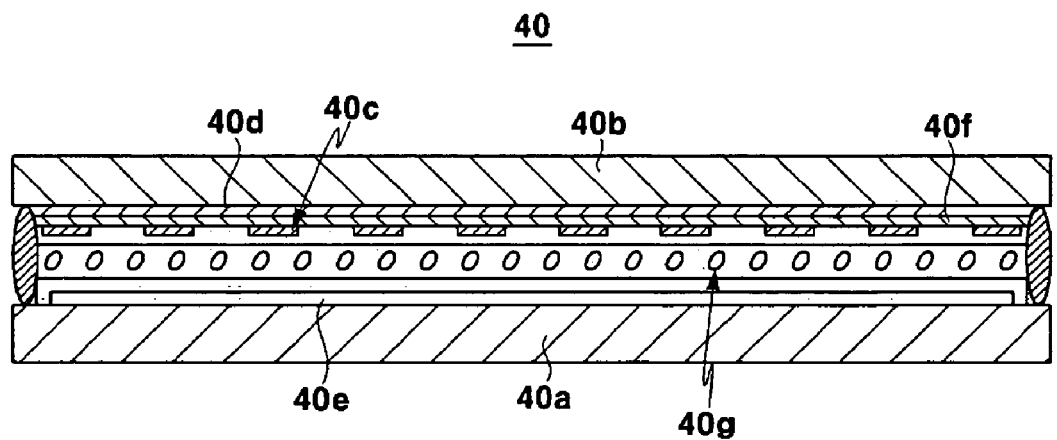
FIG. 10 is a cross-sectional view of a light controller according to a second exemplary embodiment of the present invention.

FIG. 10 is a cross-sectional view of a light controller 40 according to the second exemplary embodiment of the present invention. As shown in FIG. 10, the light controller 40 also has a structure to provide a user with an image realized on the imager by driving liquid crystal while the image is split into a left eye image and a right eye image. The light controller 40 can be used, for example, as the light controller 24 of FIG. 3 according to the second exemplary embodiment.

Figure 11:
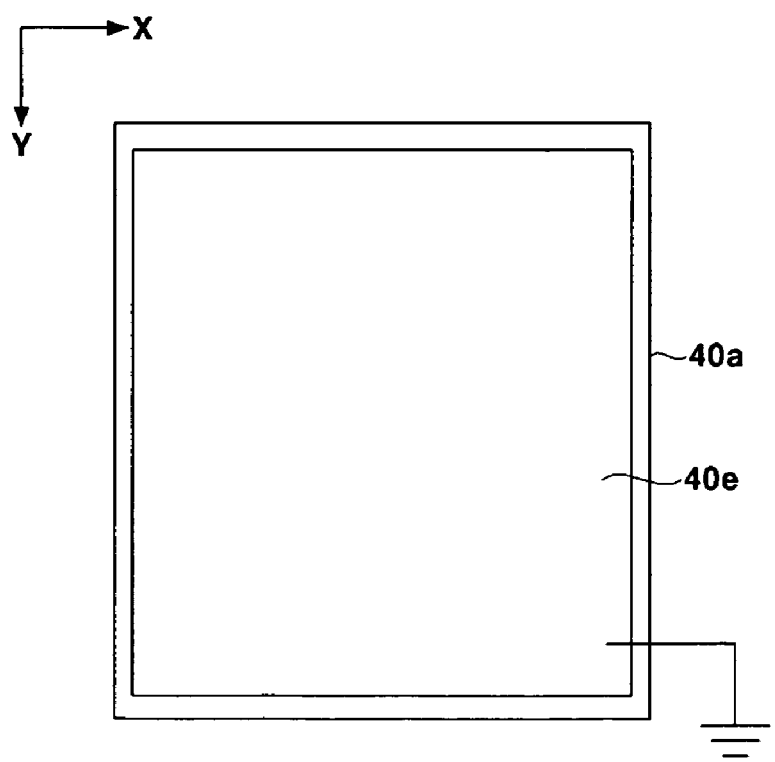
FIG. 11 is a plan view of a surface electrode according to the second exemplary embodiment of the present invention.

The light controller 40 includes two substrates, namely, a first substrate 40a and a second substrate 40b, which are arranged to be substantially parallel to each other. A surface electrode 40e formed on a substantially entire surface is formed on one surface of one of the two substrates, for example, the first substrate 40a (See FIG. 11).

Branch type electrodes 40c, 40d which are substantially the same as the electrode sets described above are formed on a surface of the second substrate 40b opposite to the first substrate 40a. The branch type electrodes 40c, 40d also have the shape of a comb similar to the above electrode sets.

These branch type electrodes 40c, 40d are arranged as multiple layers (double layers for the exemplary embodiment) on the second substrate 40b, and are insulated from each other. For this, an insulating layer 40f is provided between the branch type electrodes 40c, 40d.

Figure 12A:
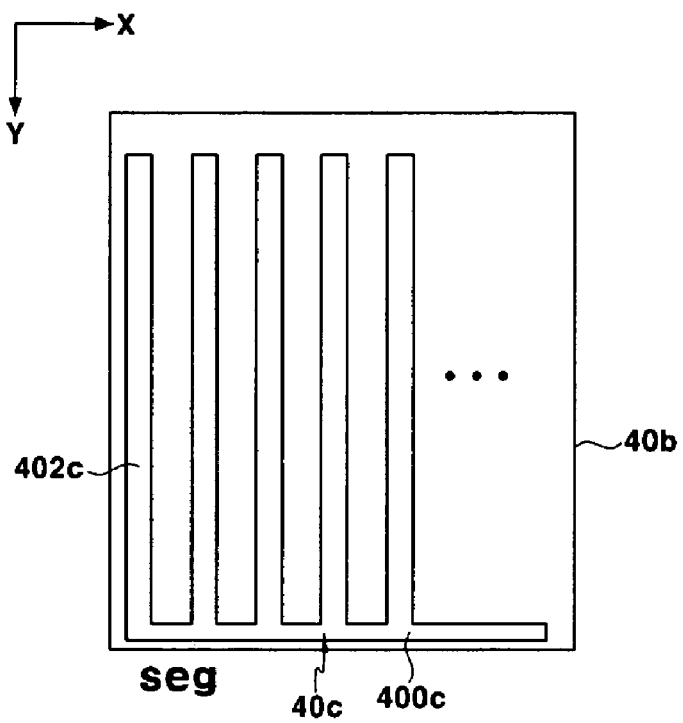
FIGS. 12A and 12B are plan views that illustrate branch type electrodes according to the second exemplary embodiment of the present invention.
Figure 12B:
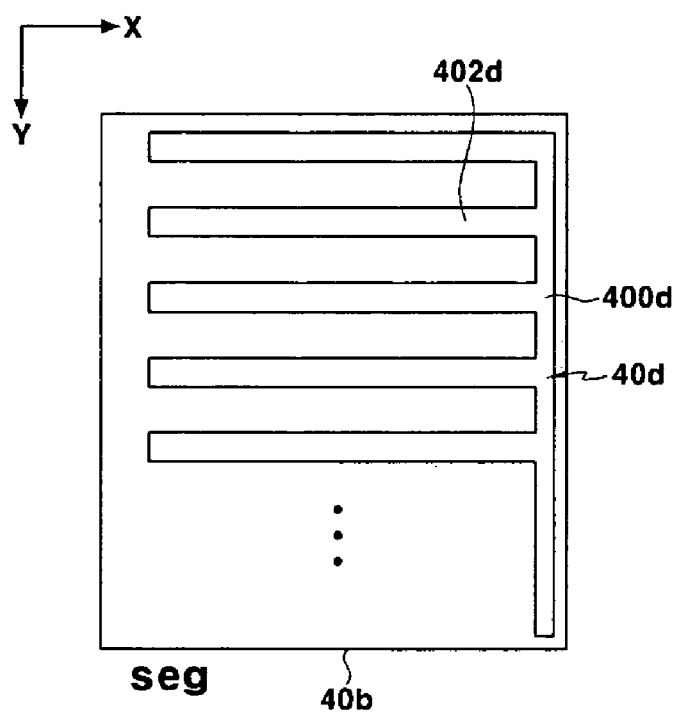

FIGS. 12A and 12B are plan views illustrating the branch type electrodes 40c, 40d. The second branch type electrode 40d formed on the second substrate 40b has a parent electrode portion 400d arranged along the long side (i.e., the Y direction) of the second substrate 40b, and plural branched electrode portions 402d having a stripe pattern arranged along the short side (i.e., the X direction) of the second electrode 40b by branching off from the parent electrode portion 400d.

On the other hand, the first branch type electrode 40c arranged over the second branch type electrodes 40d, has a parent electrode portion 400c arranged along the short side (i.e., the X direction) of the second substrate 40b, and plural branched electrode portions 402c having a stripe pattern arranged along the long side (i.e., the Y direction) of the second electrode 40b by branching off from the parent electrode portion 400c.

If necessary, the first branch type electrode 40c and the second branch type electrode 40d can exchange the shape of their patterns with each other.

When both of the first branch type electrode 40c and the second branch type electrode 40d with the above structure are arranged on the second substrate 40b, the branched electrode portion 402c of the first branch type electrode 40c is perpendicular to the branched electrode portion 402d of the second branch type electrode 40d to form a matrix structure.

The first substrate 40a and the second substrate 40b are assembled together with the surface electrode 40e and the branch type electrodes 40c, 40d facing or opposing each other, and liquid crystal 40g is injected between them.

The light controller 40 with the above structure is arranged as shown in FIG. 3 (where the light controller 40 is used as the light controller 24 in the second exemplary embodiment) to provide a user with an image realized on the imager 22 as a three dimensional image by transmitting or blocking the light provided by the light source 24.

Figure 13A:
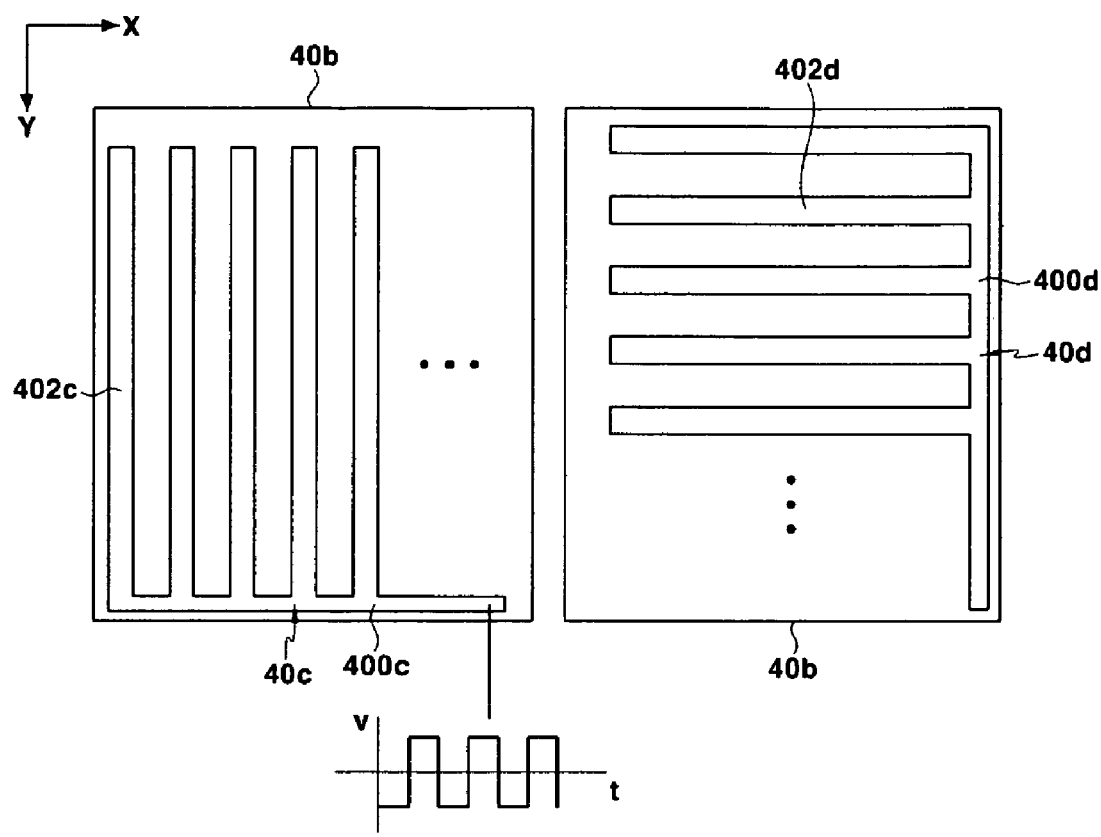
FIG. 13A is a plan view that illustrates a driving status for the first mode of the light controller according to the second exemplary embodiment of the present invention.

In the first mode or the second mode of the display portion 10, it works as follows. In the first mode, a reference voltage is applied to the surface electrode 40e, and a data voltage is applied only to the first branch type electrode 40c on the second substrate 40b, as shown in FIG. 13A.

Then, the liquid crystal 40g corresponding to the lines of the branched electrode portions 402c of the branch type electrode 40c is driven, and the light for the image realized on the imager 22 is transmitted or blocked by the light controller 40 which drives the liquid crystal to split the image on the imager 22 into a left eye image and a right eye image, respectively, which thereby makes the user perceive the image realized on the imager 22 as a three dimensional image.

Figure 13B:
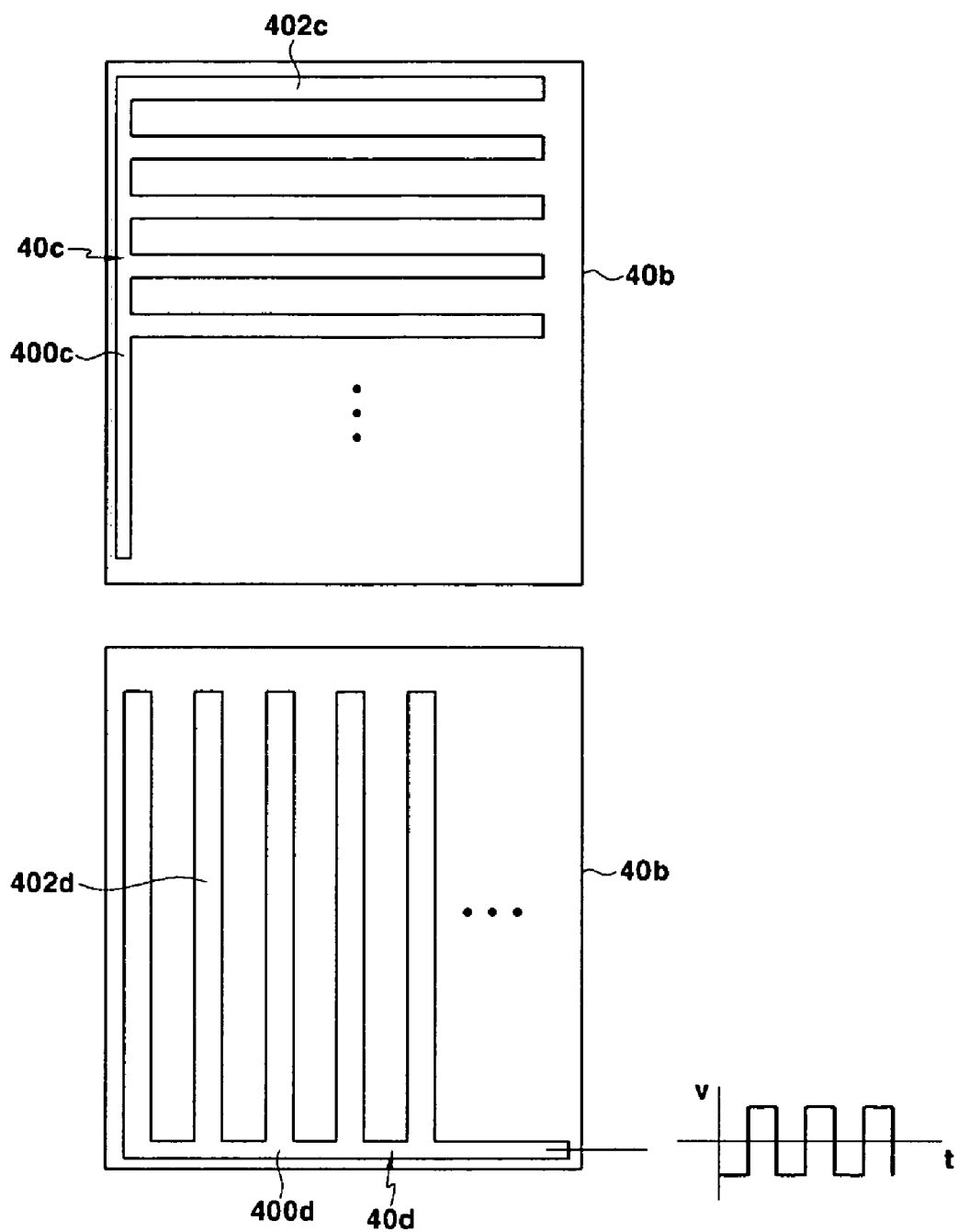
FIG. 13B is a plan view that illustrates a driving status for the second mode of the light controller according to the second exemplary embodiment of the present invention.

In addition, if the display portion 10 is changed to the second mode, the reference voltage is also applied to the surface electrode 40e of the first substrate 40a, and unlike the first mode, the data voltage is applied to the second branch type electrode 40d on the second substrate 40b (See FIG. 13B).

That is, in the second mode, the second branch type electrode 40d is arranged vertically on the display portion 10 in the same manner as the first branch type electrode 40c in the first mode. Therefore, if the liquid crystal 40g corresponding to the lines of the branched electrode portions 402d of the second branch type electrode 40d is driven as the voltage like the above is applied, the light transmitting portions and the light blocking portions have substantially the same pattern as in the first mode, which enables the user to perceive the image realized on the imager 22 as a three dimensional image without any difficulty even in the second mode.

As described above, the exemplary embodiments of the present invention can provide a user with an appropriate three dimensional image regardless of whether the display portion is in a portrait mode or in a landscape mode, and, accordingly, the described embodiments can satisfy user requirements for such a display.

Although the present invention has been described in detail hereinabove in connection with certain exemplary embodiments, it should be understood that the invention is not limited to the disclosed exemplary embodiments, but on the contrary is intended to cover various modifications and/or equivalent arrangements included within the spirit and scope of the present invention, as defined in the appended claims.

Figure 14:
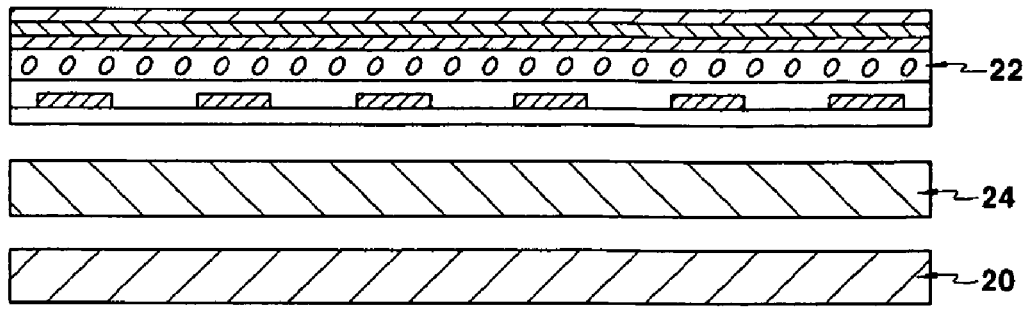
FIG. 14 is a cross-sectional view of a stereoscopic image display device according to another exemplary embodiment of the present invention.

For example, the light controller 24 of the described exemplary embodiments can be arranged between the light source 20 and the imager 22 to work as shown in FIG. 14. Of course, the light controller 24 can be replaced by the light controller 25 of FIG. 5 or the light controller 40 of FIG. 10.

Moreover, in the present invention, the imager for realizing the image can include not only a liquid crystal panel but also other displays such as cathode ray tubes, plasma display panels, field emission display devices, and organic light emitting devices. In the latter case, the light controller, e.g., a liquid crystal barrier, can be arranged in front of the imager.

Figure 15:
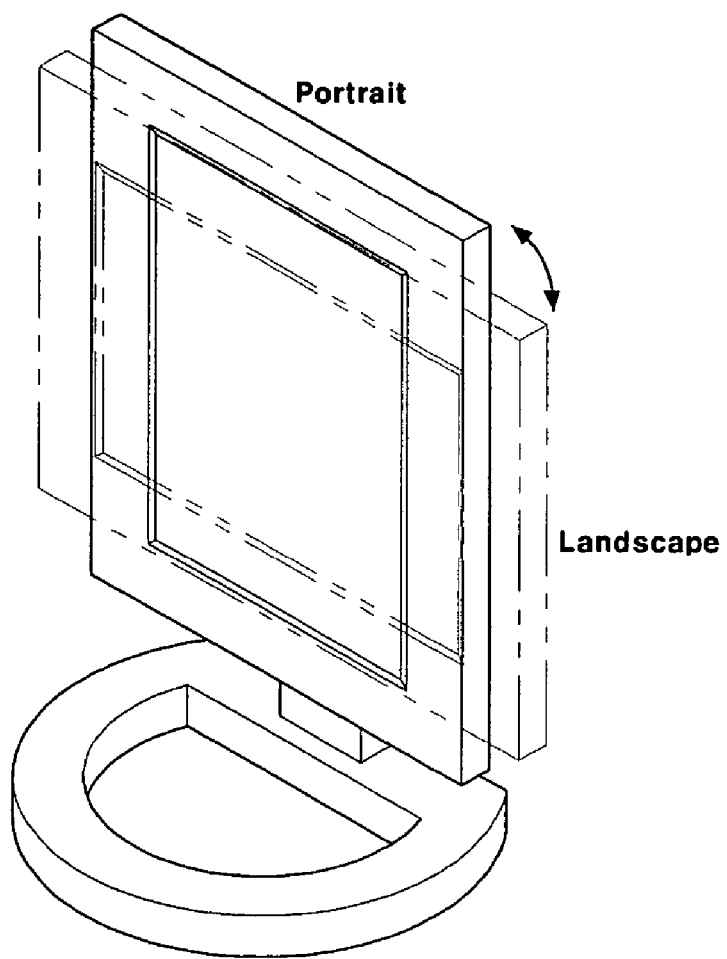
FIG. 15 is a perspective view that illustrates an electronic device according to another exemplary embodiment of the present invention.

In addition, the electronic devices of the present invention can be applied to not only the mobile phone mentioned above but also other electronic devices such as monitors as shown in FIG. 15.

The above exemplary embodiments show that the first, second, third, and fourth electrodes of the light controller are formed in a stripe pattern, and the light transmitting portions and the light blocking portions are formed in the stripe pattern along one direction of the substrate. However, the present invention is not limited to such cases.

That is, the light transmitting portions and the light blocking portions can be formed, for example, in a zig zag pattern along one direction of the substrate. In that case, the first, second, third, and fourth electrodes of the light controller or the branched electrode portions of the branch type electrode in the exemplary embodiments have the shape of a stair or a zig zag (or meander), which allows the light transmitting portions and the light blocking portions to maintain a zig zag pattern.

If the light transmitting portions and the light blocking portions of the light controller of the present invention have the shape of a zig zag, i.e., they are arranged to cross on a straight line along one direction of the substrate, when realizing a left eye image and a right eye image, the horizontal resolution of the realized image can be the same as the resolution when realizing a two dimensional image, and thus the resolution of the stereoscopic image can be improved.

What is claimed is:

1. A stereoscopic image display device for providing a stereoscopic image to a user, the stereoscopic image display device comprising:
    a light source; and
    a light controller for selectively transmitting or blocking light provided by the light source,
    wherein the light controller includes,
    a first substrate;
    first electrodes formed on the first substrate along a first direction of the first substrate, the first electrodes being spaced apart from each other at a predetermined interval;
    a first connection electrode arranged on one side of the first electrodes and electrically connected to the first electrodes to form a first electrode set together with the first electrodes;
    second electrodes formed along the first direction and arranged between the first electrodes;
    a second connection electrode arranged on one side of the second electrodes and electrically connected to the second electrodes to form a second electrode set together with the second electrodes;
    a second substrate;
    third electrodes formed on the second substrate along a second direction which is perpendicular to the first direction, the third electrodes being spaced apart from each other at a predetermined interval;
    a third connection electrode arranged on one side of the third electrodes and electrically connected to the third electrodes to form a third electrode set together with the third electrodes;
    fourth electrodes formed along the second direction and arranged between the third electrodes;
    a fourth connection electrode arranged on one side of the fourth electrodes and electrically connected to the fourth electrodes to form a fourth electrode set together with the fourth electrodes; and
    liquid crystal disposed between the first substrate and the second substrate.

2. The stereoscopic image display device of claim 1, wherein at least one of the first electrodes is arranged between the second electrodes.

3. The stereoscopic image display device of claim 2, wherein a number of the first electrodes that are arranged between two neighboring ones of the second electrodes is the same at all locations on the first substrate.

4. The stereoscopic image display device of claim 1, wherein at least one of the second electrodes is arranged between two neighboring ones of the first electrodes.

5. The stereoscopic image display device of claim 4, wherein a number of the second electrodes that are arranged between two neighboring ones of the first electrodes is the same at all locations on the first substrate.

6. The stereoscopic image display device of claim 1, wherein at least one of the third electrodes is arranged between the fourth electrodes.

7. The stereoscopic image display device of claim 6, wherein a number of the third electrodes that are arranged between two neighboring ones of the fourth electrodes is the same at all locations on the second substrate.

8. The stereoscopic image display device of claim 1, wherein at least one of the fourth electrodes is arranged between two neighboring ones of the third electrodes.

9. The stereoscopic image display device of claim 8, wherein a number of the fourth electrodes that are arranged between two neighboring ones of the third electrodes is the same at all locations on the second substrate.

10. The stereoscopic image display device of claim 1, wherein the first substrate is formed in a shape of a rectangle having a pair of long sides and a pair of short sides, and the first direction is a direction along the short sides of the first substrate.

11. The stereoscopic image display device of claim 10, wherein the first electrodes and the second electrodes are configured as a common electrode.

12. The stereoscopic image display device of claim 11, wherein a distance between one of the first electrodes and an adjacent one of the second electrodes is less than or equal to 6 µm.

13. The stereoscopic image display device of claim 1, wherein the second substrate is formed in a shape of a rectangle having a pair of long sides and a pair of short sides, and the second direction is a direction along the long sides of the second substrate.

14. The stereoscopic image display device of claim 13, wherein the third electrodes and the fourth electrodes are configured as a segment electrode.

15. The stereoscopic image display device of claim 14, wherein a distance between one of the third electrodes and an adjacent one of the fourth electrodes is less than or equal to 6 μm.

16. The stereoscopic image display device of claim 1, further comprising an imager for displaying a left eye image and a right eye image, wherein the imager is interposed between the light source and the light controller.

17. The stereoscopic image display device of claim 16, wherein the imager is a liquid crystal display panel.

18. The stereoscopic image display device of claim 1, further comprising an imager for displaying a left eye image and a right eye image, wherein the light controller is interposed between the light source and the imager.

19. The stereoscopic image display device of claim 18, wherein the imager is a liquid crystal display panel.

20. The stereoscopic image display device of claim 1, wherein the first electrodes, the second electrodes, the third electrodes, and the fourth electrodes are formed in a stripe pattern.

21. The stereoscopic image display device of claim 1, wherein the electrodes of the first electrode set, the electrodes of the second electrode set, the electrodes of the third electrode set, and the electrodes of the fourth electrodes are formed in a shape of a comb.

22. An electronic device comprising:
a display portion including the stereoscopic image display device of claim 1; and
a body rotatably connected to the display portion.

23. The electronic device of claim 22, wherein the electronic device is a mobile phone or a monitor.

24. An electronic device comprising:
a display portion including the stereoscopic image display device of claim 22; and
a body rotatably connected to the display portion.

25. The electronic device of claim 24, wherein the electronic device is a mobile phone or a monitor.

26. A method of driving a stereoscopic image display device having a light controller, the light controller including,
a first substrate;
first electrodes formed on the first substrate along a first direction of the first substrate, the first electrodes being spaced apart from each other at a predetermined interval;
a first connection electrode arranged on one side of the first electrodes and electrically connected to the first electrodes to form a first electrode set together with the first electrodes;
second electrodes formed along the first direction and arranged between the first electrodes;
a second connection electrode arranged on one side of the second electrodes and electrically connected to the second electrodes to form a second electrode set together with the second electrodes;
a second substrate;
third electrodes formed on the second substrate along a second direction which is perpendicular to the first direction, the third electrodes being spaced apart from each other at a predetermined interval;
a third connection electrode arranged on one side of the third electrodes and electrically connected to the third electrodes to form a third electrode set together with the third electrodes;
fourth electrodes formed along the second direction and arranged between the third electrodes;
a fourth connection electrode arranged on one side of the fourth electrodes and electrically connected to the fourth electrodes to form a fourth electrode set together with the fourth electrodes; and
liquid crystal disposed between the first substrate and the second substrate,
the method comprising:
in a first mode when the light controller is in a predetermined position,
applying a reference voltage to the first electrode set and the second electrode set;
selecting one electrode set of the third electrode set and the fourth electrode set;
and applying a data voltage thereto to split an image into a left eye image and a right eye image; and
in a second mode when the light controller is rotated from the predetermined position to another position,
applying a reference voltage to the third electrode set and the fourth electrode set;
selecting one electrode set of the first electrode set and the second electrode set; and applying a data voltage thereto to split an image into a left eye image and a right eye image.

27. A stereoscopic image display device, comprising:
an imager for realizing an image; and
a liquid crystal barrier for splitting the image into a left eye image and a right eye image to provide the left eye and right eye images to the left eye and the right eye, respectively, of a user,
wherein the liquid crystal barrier includes,
a first substrate;
first electrodes formed on the first substrate along a first direction of the first substrate, the first electrodes being spaced apart from each other at a predetermined interval;
a first connection electrode arranged on one side of the first electrodes and electrically connected to the first electrodes to form a first electrode set together with the first electrodes;
second electrodes formed along the first direction and arranged between the first electrodes;
a second connection electrode arranged on one side of the second electrodes and electrically connected to the second electrodes to form a second electrode set together with the second electrodes;
a second substrate;
third electrodes formed on the second substrate along a second direction perpendicular to the first direction, the third electrodes being spaced apart from each other at a predetermined interval;
a third connection electrode arranged on one side of the third electrodes and electrically connected to the third electrodes to form a third electrode set together with the third electrodes;
fourth electrodes formed along the second direction and arranged between the third electrodes;
a fourth connection electrode arranged on one side of the fourth electrodes and electrically connected to the fourth electrodes to form a fourth electrode set together with the fourth electrodes; and
liquid crystal disposed between the first substrate and the second substrate.

* * * * *